(12) United States Patent
Kure et al.

(10) Patent No.: US 10,198,608 B2
(45) Date of Patent: Feb. 5, 2019

(54) INFORMATION RECORDING MEDIUM AND AUTHENTICITY DETERMINATION METHOD

(71) Applicants: Kabushiki Kaisha Toshiba, Minato-ku (JP); Toshiba Infrastructure Systems & Solutions Corporation, Kawasaki-shi (JP)

(72) Inventors: Shota Kure, Kawasaki (JP); Takahisa Nakano, Kawasaki (JP); Fumitoshi Morimoto, Shirakawa (JP); Nobuki Nemoto, Kawasaki (JP)

(73) Assignees: Kabushiki Kaisha Toshiba, Minato-ku (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 0 days.

(21) Appl. No.: 15/702,230

(22) Filed: Sep. 12, 2017

(65) Prior Publication Data

US 2018/0082092 A1    Mar. 22, 2018

(30) Foreign Application Priority Data

Sep. 16, 2016    (JP) .................................. 2016-182299

(51) Int. Cl.
| | | |
|---|---|---|
| *G06K 7/00* | (2006.01) | |
| *G06K 7/10* | (2006.01) | |
| *G07D 7/12* | (2016.01) | |
| *G07D 7/128* | (2016.01) | |
| *B42D 25/405* | (2014.01) | |
| *B42D 25/23* | (2014.01) | |
| *B42D 25/309* | (2014.01) | |
| *B42D 25/29* | (2014.01) | |

(Continued)

(52) U.S. Cl.
CPC ......... *G06K 7/10584* (2013.01); *B42D 25/23* (2014.10); *B42D 25/24* (2014.10); *B42D 25/29* (2014.10); *B42D 25/309* (2014.10); *B42D 25/342* (2014.10); *B42D 25/382* (2014.10); *B42D 25/387* (2014.10); *B42D 25/405* (2014.10); *B42D 25/45* (2014.10); *G06K 7/1093* (2013.01); *G07D 7/12* (2013.01);

(Continued)

(58) Field of Classification Search
CPC ....... G06K 7/0008; G06K 13/08; G06K 7/086
USPC ........................................................ 235/439
See application file for complete search history.

(56) References Cited

U.S. PATENT DOCUMENTS

| | | | | |
|---|---|---|---|---|
| 6,296,188 B1 * | 10/2001 | Kiekhaefer | ............ | G06K 19/14 235/487 |
| 2006/0196948 A1 * | 9/2006 | Weber | .................... | B42D 25/00 235/487 |

(Continued)

FOREIGN PATENT DOCUMENTS

| | | |
|---|---|---|
| EP | 2 460 665 A1 | 6/2012 |
| JP | 2008-207335 | 9/2008 |

(Continued)

*Primary Examiner* — Ahshik Kim
(74) *Attorney, Agent, or Firm* — Oblon, McClelland, Maier & Neustadt, L.L.P.

(57) ABSTRACT

An information recording medium according to one embodiment includes a substrate, a first image, and a second image. The first image is provided on the substrate, emits light when irradiated with first excitation light having a first wavelength, and includes phase-modulated first information. The second image is provided on the substrate, emits light when irradiated with second excitation light having a second wavelength different from the first wavelength, and includes phase-modulated second information.

13 Claims, 18 Drawing Sheets

(51) Int. Cl.
  *B42D 25/45* (2014.01)
  *B42D 25/342* (2014.01)
  *B42D 25/382* (2014.01)
  *B42D 25/387* (2014.01)
  *B42D 25/24* (2014.01)
  *G06K 9/20* (2006.01)
  *G06Q 20/10* (2012.01)

(52) U.S. Cl.
  CPC ..... *G07D 7/128* (2013.01); *G06K 2009/2045* (2013.01); *G06Q 20/105* (2013.01)

(56) References Cited

U.S. PATENT DOCUMENTS

2007/0008595 A1* 1/2007 Watanabe ............. G03H 1/08
                                                         359/2
2009/0242646 A1* 10/2009 Aznar ................ B42D 25/00
                                                         235/492
2017/0293263 A1* 10/2017 Kitamura ............ G03H 1/2202

FOREIGN PATENT DOCUMENTS

| | | |
|---|---|---|
| JP | 2009-113392 | 5/2009 |
| JP | 2010-111049 | 5/2010 |
| JP | 2012-16836 | 1/2012 |
| JP | 2015-58598 | 3/2015 |
| JP | 2016-49749 | 4/2016 |
| JP | 2016-91121 | 5/2016 |
| WO | WO 2007/115656 A2 | 10/2007 |
| WO | WO 2013/143009 A1 | 10/2013 |
| WO | WO 2016/133716 A8 | 8/2016 |

* cited by examiner

INFORMATION RECORDING MEDIUM AND AUTHENTICITY DETERMINATION METHOD

CROSS-REFERENCE TO RELATED APPLICATION

This application is based upon and claims the benefit of priority from Japanese Patent Application No. 2016-182299, filed Sep. 16, 2016, the entire contents of which are incorporated herein by reference.

FIELD

Embodiments described herein relate generally to an information recording medium and an authenticity determination method.

BACKGROUND

Various kinds of information recording media, such as ID cards, are at risk of counterfeits or forgeries including alterations of various kinds of information such as photographs and names, for example. For the purpose of prevention of such counterfeits and forgeries, an information recording medium may include printed security information or an IC inlet storing security information.

Even the information recording medium containing security information may not be completely secure, considering that the security information may be cryptanalyzed.

DETAILED DESCRIPTION

In general, according to one embodiment, an information recording medium includes a substrate, a first image, and a second image. The first image is provided on the substrate, emits light when irradiated with first excitation light having a first wavelength, and includes phase-modulated first information. The second image is provided on the substrate, emits light when irradiated with second excitation light having a second wavelength different from the first wavelength, and includes phase-modulated second information.

Referring to the accompanying drawings, an information recording medium and an authenticity determination method according to embodiments will be described below.

Now, a first embodiment is described with reference to FIG. 1 to FIG. 14. Through this disclosure, components according to embodiments may be represented differently and described differently. The components differently represented or described may be given other expressions. Components given no different representations and descriptions may also be expressed differently.

Figure 1:
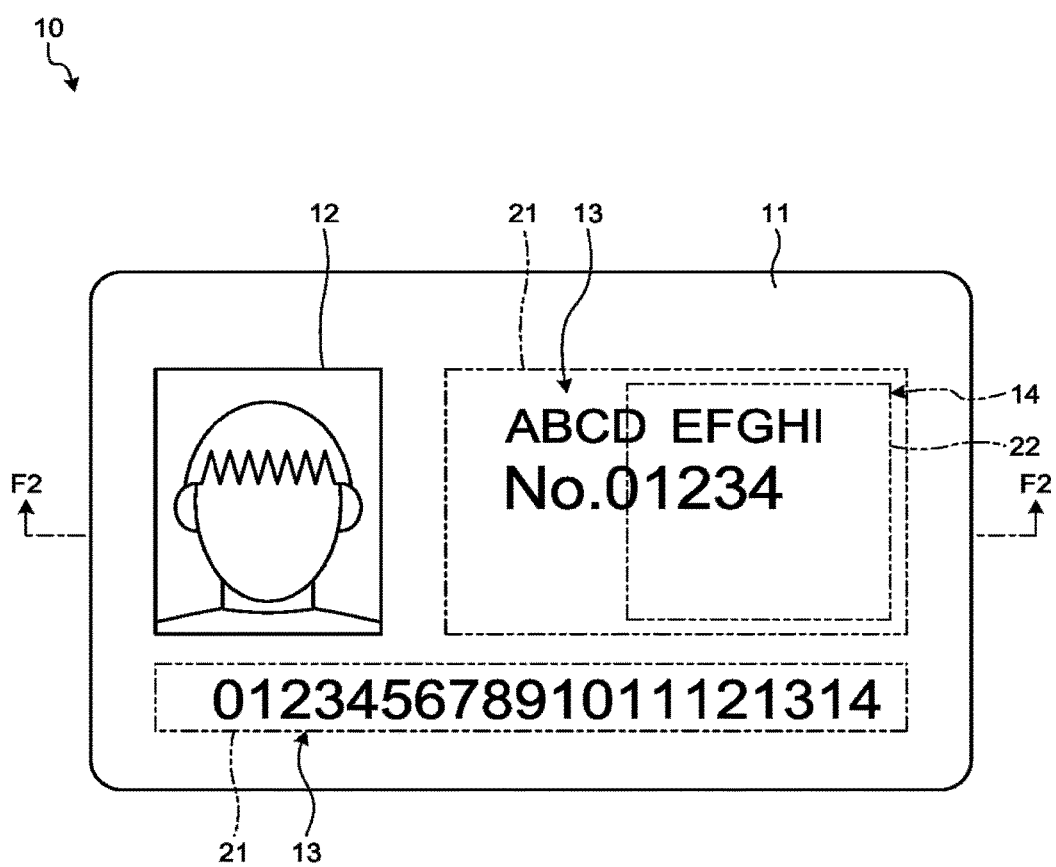
FIG. 1 is a plan view of an ID card according to a first embodiment.

FIG. 1 is a plan view of an ID card 10 according to the first embodiment. The ID card 10 is an example of an information recording medium, and can be referred to also as, for example, a card, an anti-counterfeit medium, a print medium, a print object, or an information display. The information recording medium is not limited to the ID card 10, and may be a medium of various kinds, such as a passport, a driver's license, an admission card, a bill, securities, a tag, a compact disc (CD), and a digital versatile disc (DVD).

As illustrated in FIG. 1, the ID card 10 has a substantially flat surface 11. A photograph 12 and various kinds of character information 13 are displayed on the surface 11. Examples of the photograph 12 include a photograph of the face of a person who holds the ID card 10.

Examples of the character information 13 include personal information of a person who holds the ID card 10, such as name, phonetic name, alphabetic notation, birth date, address, and phone number as well as card information such as issue date, expiry date, and the issue number (serial number) of the ID card 10, and item names of the personal information and the card information.

The personal information and the card information are unique information to the ID card 10. In other words, the personal information and the card information are identification information of an intended person, and are used to identify the ID card 10 or a person who holds the ID card 10 and confirm the person's identity. The item names are information common to ID cards 10.

The character information 13 is an image representing characters, and can be referred to also as information, an image, a character, a character string, a sentence, language information, or a display element. The character information 13 may be displayed on a surface other than the surface 11. The character as used herein includes a number and a symbol.

The photograph 12 and the character information 13 are formed with ink that reflects visible light. Thus, the photograph 12 and the character information 13 can be viewed or becomes visible in an environment under illumination with visible light such as natural light.

Security information 14 is further displayed on the surface 11. The security information 14 can be referred to also as, for example, a latent image. The security information 14 is formed with invisible, fluorescent ink, and transmits visible light therethrough. Thus, the security information 14, when illuminated with visible light, is substantially transparent and is prevented from being viewed. FIG. 1 schematically shows an area displaying the security information 14 by the arrow. For example, the security information 14 is used for authenticity determination of the ID card 10.

The surface 11 includes first regions 21 and a second region 22. The first regions 21 are for displaying the photograph 12 and the character information 13. In other words, the first regions 21 display visible information when irradiated with visible light. The second region 22 is for displaying the security information 14. In other words, the second region 22, when illuminated with visible light, displays information through which visible light transmits and which is not visible.

In the present embodiment, the second region 22 is superimposed at least partially on one of the first regions 21. The second region 22 may be provided outside the first region 21. Two or more second regions 22 may be provided on the surface 11.

Figure 2:
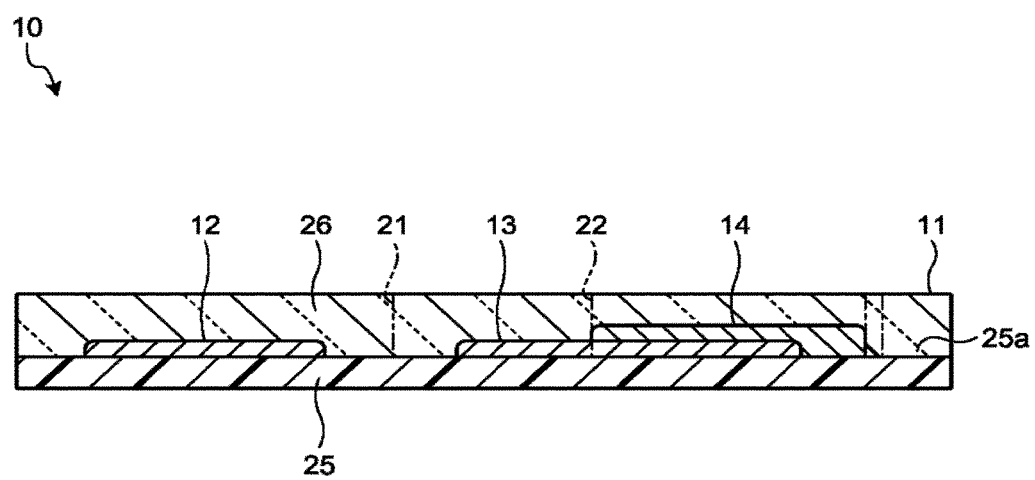
FIG. 2 is a cross-sectional view of the ID card in the first embodiment, taken along the F2 to F2 line in FIG. 1.

FIG. 2 is a cross-sectional view of the ID card 10 in the first embodiment, taken along the F2 to F2 line in FIG. 1. As illustrated in FIG. 2, the ID card 10 includes a substrate 25 and an overcoat layer 26.

The substrate 25 has a card shape, and is made of, for example, synthetic resin or paper. The substrate 25 has a print surface 25*a*. The photograph 12, the character information 13, and the security information 14 are printed on the print surface 25*a*. In other words, the photograph 12, the character information 13, and the security information 14 are provided on the substrate 25.

As illustrated in FIG. 2, the invisible, fluorescent ink with which the security information 14 is drawn is superimposed on at least part of the ink with which the character information 13 is drawn. In other words, the character information 13 drawn with the ink is located between the substrate 25 and the security information 14 drawn with the invisible, fluorescent ink.

The overcoat layer 26 is made of, for example, substantially transparent synthetic resin. The overcoat layer 26 covers the print surface 25*a* of the substrate 25, the character information 13 drawn with the ink, and the security information 14 drawn with the invisible, fluorescent ink for protection. The overcoat layer 26 forms the surface 11 of the ID card 10.

Figure 3:
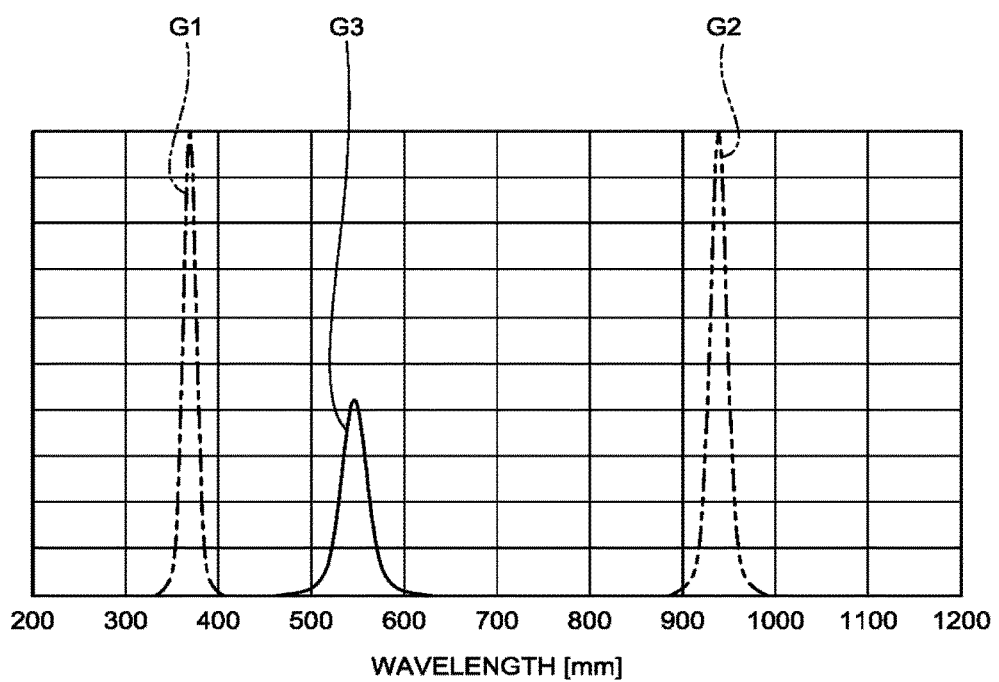
FIG. 3 is a graph illustrating a spectral distribution of excitation light and fluorescent light of security information in the first embodiment.

FIG. 3 is a graph illustrating a spectral distribution of excitation light and fluorescent light of the security information 14 in the first embodiment. As illustrated in FIG. 3, the security information 14 is excited by first excitation light L1 indicated by a first spectral distribution curve G1 and second excitation light L2 indicated by a second spectral distribution curve G2, and emits visible light (fluorescent light) indicated by a third spectral distribution curve G3.

As indicated by the first spectral distribution curve G1, the first excitation light L1 is an ultraviolet ray (UV), and has a distribution of wavelength around about 365 nm. The wavelength of 365 nm is an example of a first wavelength, and is in an ultraviolet bandwidth that is an invisible bandwidth.

As indicated by the second spectral distribution curve G2, the second excitation light L2 is a near-infrared ray (IR), and has a distribution of wavelength around about 950 nm. The wavelength of 950 nm is an example of a second wavelength, and is in a near-infrared bandwidth that is an invisible bandwidth. The near-infrared bandwidth is included in an infrared bandwidth.

As indicated by the third spectral distribution curve G3, the security information 14 emits visible light (green light) having a distribution of wavelength around about 550 nm. The security information 14 may emit light having another wavelength (for example, blue light or red light), and may emit light having different wavelengths.

Figure 4:
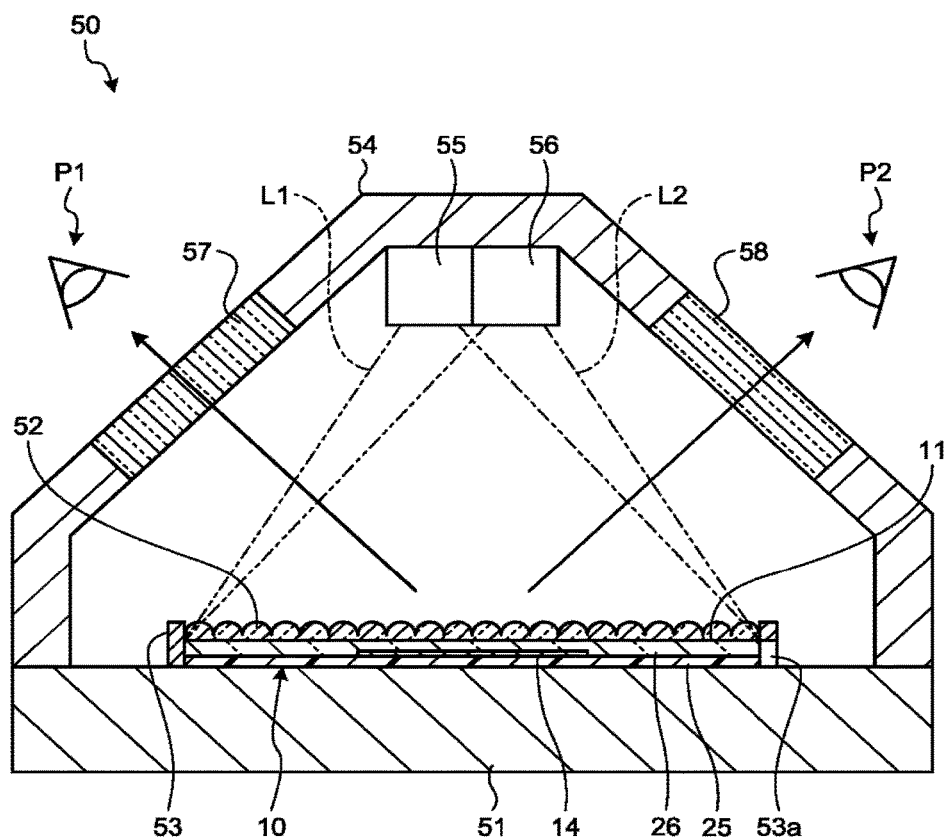
FIG. 4 is a cross-sectional view of an authenticity determination device in the first embodiment.

FIG. 4 is a cross-sectional view of an authenticity determination device 50 in the first embodiment. The authenticity determination device 50 is used for authenticity determination of the ID card 10. The authenticity determination device 50 includes a base 51, a discriminant member 52, a mount 53, a cover 54, a first light source 55, a second light source 56, a first window 57, and a second window 58.

For example, the base 51 has a plate shape. The mount 53 holds the discriminant member 52 away from the base 51. For example, the mount 53 has a frame shape that can surround the ID card 10.

The mount 53 is provided with a slit 53*a*. The ID card 10 is inserted from the slit 53*a* into the mount 53 for inspection. The ID card 10 placed inside the mount 53 for inspection is placed on the base 51 and covered with the discriminant member 52. The discriminant member 52 contacts with the surface 11 of the ID card 10, but may be slightly separated away from the surface 11.

Examples of the discriminant member 52 include a lenticular lens. The lenticular lens 52 is an array of semicylindrical (semicircular column) lenses connected radially (for example, horizontally in FIG. 4). A substantially flat face of the discriminant member 52 faces the ID card 10 placed for inspection. A convex face of the discriminant member 52 faces opposite the ID card 10 positioned for inspection.

The cover 54 is made from, for example, a light-shielding material, and has a substantially dome shape. The cover 54 is removably attached to the base 51, and covers the discriminant member 52, the mount 53, and the ID card 10 positioned for inspection. The first light source 55 and the second light source 56 are attached to the cover 54.

Examples of the first light source 55 include an LED and a lamp which are capable of emitting ultraviolet rays. The first light source 55 irradiates the ID card 10 positioned for inspection with the first excitation light L1 through the discriminant member 52.

Examples of the second light source 56 include an LED and a lamp which are capable of emitting infrared rays. The second light source 56 irradiates the ID card 10 positioned for inspection with the second excitation light L2 through the discriminant member 52.

The cover 54 is provided with the first window 57 and the second window 58. The first window 57 and the second window 58 are made from a substantially transparent material. The first window 57 and the second window 58 are not limited to this example, and may block light having a particular wavelength, for example.

The first window 57 is provided at a different position from the second window 58. Specifically, the first window 57 is provided at a circumferentially different position from the second window 58 on the semicircular convex face of the discriminant member 52. In other words, the first window 57 is oriented at the discriminant member 52 with a different angle from the second window 58.

Figure 5:
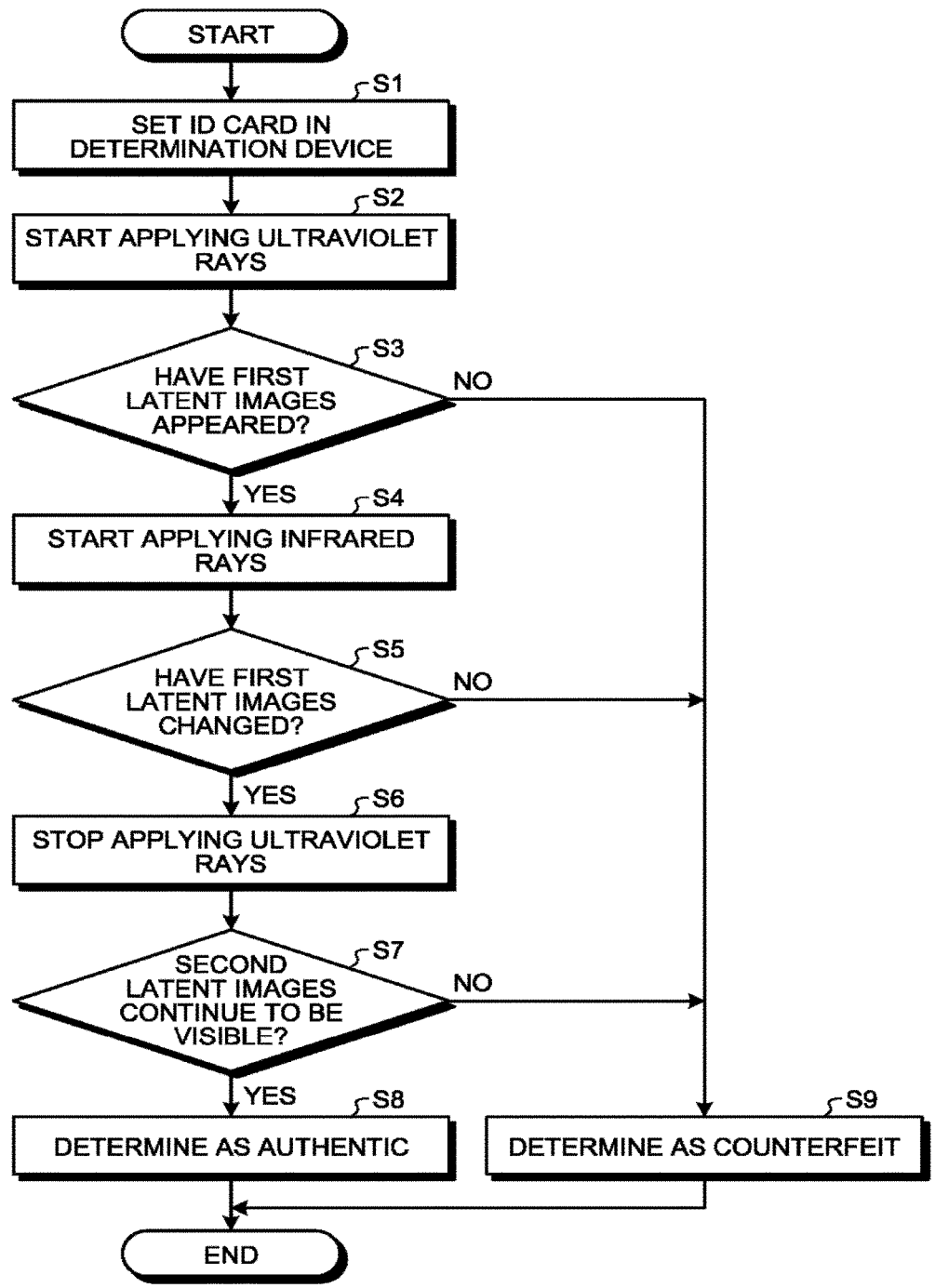
FIG. 5 is a flowchart of an example of an ID card authenticity determination method in the first embodiment.

FIG. 5 is a flowchart of an example of an authenticity determination method for the ID card 10 in the first embodiment. An example of the ID card 10 and an authenticity determination method for the ID card 10 is now described. The authenticity determination method for the ID card 10 is not limited to the method described below.

As illustrated in FIG. 5, first, the ID card 10 is set in the authenticity determination device (determination device) 50 (S1). For example, the cover 54 is removed from the base 51, and the ID card 10 is inserted from the slit 53a into the mount 53. Thereby, the ID card 10 is covered with the discriminant member 52. The surface 11 of the ID card 10 is directed at a substantially flat surface of the discriminant member 52. When the ID card 10 is set, the cover 54 is attached to the base 51 to cover the discriminant member 52 and the ID card 10.

Next, the first light source 55 irradiates the ID card 10 with the first excitation light (ultraviolet ray) L1 (S2). In other words, the first light source 55 irradiates the security information 14 on the surface 11 of the ID card 10 with the first excitation light L1.

Figure 6:
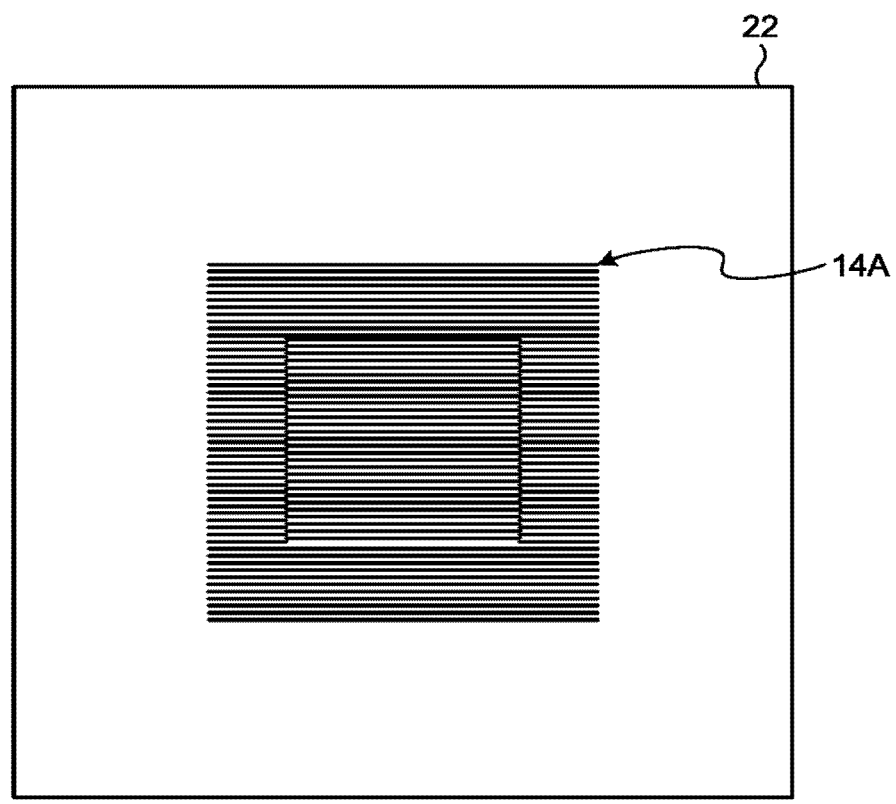
FIG. 6 is a plan view illustrating a first modulation pattern of security information in the first embodiment.

FIG. 6 is a plan view illustrating a first modulation pattern 14A of the security information 14 in the first embodiment. As illustrated in FIG. 6, the security information 14 includes the first modulation pattern 14A. The first modulation pattern 14A is an example of a first image, and can be referred to also as, for example, information, security information, or a phase-modulated pattern.

The first modulation pattern 14A is formed with invisible, fluorescent ink that emits light when irradiated with excitation light having a first wavelength (about 365 nm) such as the first excitation light L1. Thus, activated by the first excitation light L1, the first modulation pattern 14A emits light, and becomes visible.

The first modulation pattern 14A emits light in a visible bandwidth indicated by the third spectral distribution curve G3 in FIG. 3 due to the first excitation light L1. In other words, the first modulation pattern 14A can be viewed or visualized when irradiated with the first excitation light L1.

As illustrated in FIG. 6, the first modulation pattern 14A is formed of lines (parallel lines) extending in a first direction with intervals in a second direction. In FIG. 6, the first direction is horizontal direction, and the second direction is vertical direction. The area where the parallel lines extend can be referred to as a line area. The intervals between the parallel lines can be referred to as non-line areas.

The parallel lines include first lines arranged with predetermined intervals (pitches) in the second direction and second lines that are shifted from the first lines by, for example, half pitches. The first modulation pattern 14A is not limited to this example.

For example, the first modulation pattern 14A may be formed of dots (halftone dots). The halftone dots include first dots arranged with predetermined pitches in the first direction and the second direction and second dots shifted from the first dots in at least one of the first direction and the second direction by a half pitch, for example.

Figure 7:
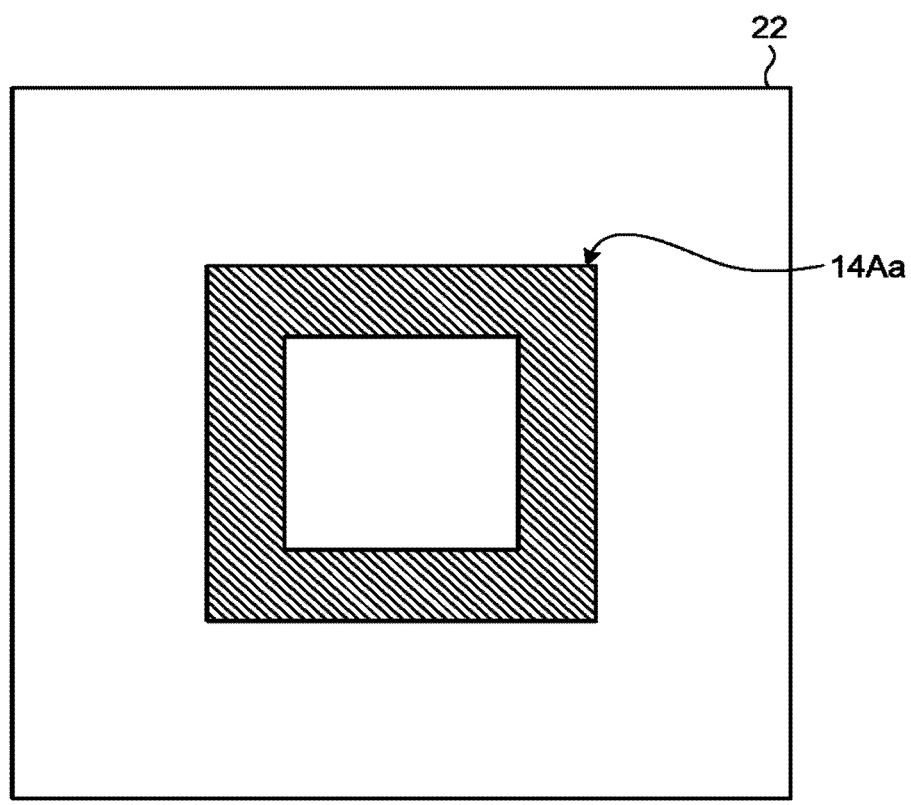
FIG. 7 is a plan view illustrating one first latent image in the first embodiment.
Figure 8:
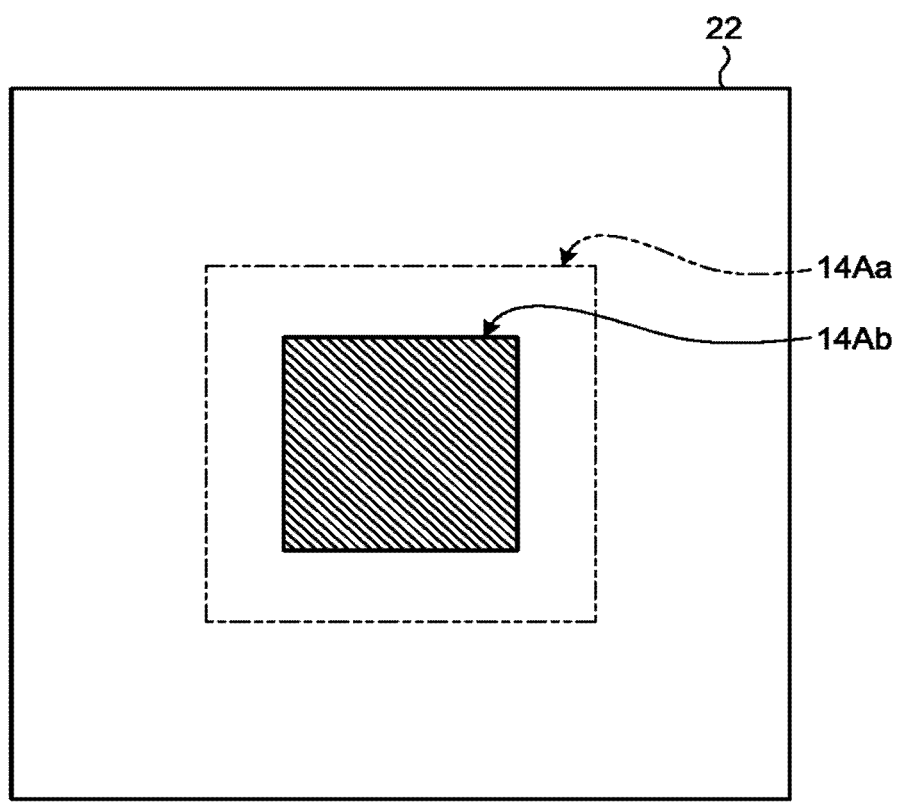
FIG. 8 is a plan view illustrating the other first latent image in the first embodiment.

FIG. 7 is a plan view illustrating a first latent image 14Aa in the first embodiment. FIG. 8 is a plan view illustrating a first latent image 14Ab in the first embodiment. The first latent images 14Aa and 14Ab are examples of first information. The first latent images 14Aa and 14Ab are information hidden in the first modulation pattern 14A. In other words, the first latent images 14Aa and 14Ab are included in the first modulation pattern 14A.

For example, the first latent images 14Aa and 14Ab become hidden in the first modulation pattern 14A through line phase modulation. In other words, the first latent images 14Aa and 14Ab are subjected to line phase modulation to form the first modulation pattern 14A. The first latent images 14Aa and 14Ab are formed of the second lines shifted from the first lines by a half pitch.

For example, the first latent images 14Aa and 14Ab are divided in the vertical direction (first direction) in FIG. 7. The divided first latent images 14Aa and 14Ab are reduced in the first direction by a predetermined method, thereby forming the second lines (parallel lines) arranged with intervals in the first direction. The first latent images 14Aa and 14Ab are subjected to line phase modulation in this manner to form a first modulation pattern 14A.

For example, the first modulation pattern 14A is covered with the discriminant member 52 such that the extending direction of the parallel lines of the first modulation pattern 14A and the extending direction of the semicylindrical lenses of the discriminant member 52 match with each other. Thereby, the first modulation pattern 14A shows the first latent images 14Aa and 14Ab through the discriminant member 52. In other words, the first latent images 14Aa and 14Ab can be viewed or are visualized. The pitches of the parallel lines and the pitches of the semicylindrical lenses of the discriminant member 52 are substantially equal to each other.

As described above, the discriminant member 52 visualizes the phase-modulated images. Examples of the phase modulation include the above-mentioned line phase modulation and dot phase modulation. The first latent images 14Aa and 14Ab subjected to line phase modulation form the first modulation pattern 14A of parallel lines. The first latent images 14Aa and 14Ab subjected to dot phase modulation form the first modulation pattern 14A of halftone dots. The first latent images 14Aa and 14Ab subjected to dot phase modulation are formed of second dots that are shifted from first dots by a half pitch. The first latent images 14Aa and 14Ab may be subjected to another phase modulation.

The first latent image 14Aa is displayed (viewed), for example, when the first modulation pattern 14A is viewed from a first position P1 in FIG. 4 through the discriminant member 52. The first latent image 14Ab is displayed (viewed), for example, when the first modulation pattern 14A is viewed from a second position P2 in FIG. 4 through the discriminant member 52. Specifically, the first modulation pattern 14A covered with the discriminant member 52 shows the first latent images 14Aa and 14Ab in different shapes depending on the position of a viewer. In other words, the first latent images 14Aa and 14Ab change in shape depending on the position of a viewer. The first latent images 14Aa and 14Ab may change in two or more different shapes.

As illustrated in FIG. 7, the first latent image 14Aa has a quadrangular (frame) shape that is hollow inside. The first latent image 14Aa may have another shape. In FIG. 7, the area of the first latent image 14Aa, that is, the area formed by visible light emitted from the invisible, fluorescent ink and to be recognized as a different color from the background, is indicated by hatching.

As illustrated in FIG. 8, the first latent image 14Ab has a quadrangular shape smaller than the first latent image 14Aa. The first latent image 14Ab may have another shape. In FIG. 8, the area of the first latent image 14Ab, that is, the area formed by visible light emitted from the invisible, fluorescent ink and to be recognized as a different color from the background, is indicated by hatching.

The shape of the first latent image 14Ab substantially matches with the shape of a region surrounded by the frame-shaped first latent image 14Aa. Specifically, the light emitting region and the light non-emitting region are inverse between the first latent image 14Aa and the first latent image 14Ab. That is, the first latent image 14Aa and the first latent image 14Ab are such that when one is positive, the other is negative, and vice versa. The first latent image 14Aa and the first latent image 14Ab are not limited to this example.

As illustrated in FIG. 5, it is determined whether the first latent images 14Aa and 14Ab have appeared by the first excitation light L1 (S3). For example, it is determined whether the predetermined first latent images 14Aa and 14Ab are viewed through the discriminant member 52. In this case, a determination is made on whether both of the first latent image 14Aa and the first latent image 14Ab are visible. However, it may be determined whether one of the first latent image 14Aa and the first latent image 14Ab is visible.

When it is determined that the first latent images 14Aa and 14Ab have appeared (Yes at S3), the second light source 56 irradiates the ID card 10 with the second excitation light (infrared ray) L2 while the first light source 55 irradiates the ID card 10 with the first excitation light L1 (S4). In other words, the first light source 55 and the second light source 56 simultaneously irradiate the security information 14 on the surface 11 of the ID card 10 with the first excitation light L1 and the second excitation light L2, respectively.

Figure 9:
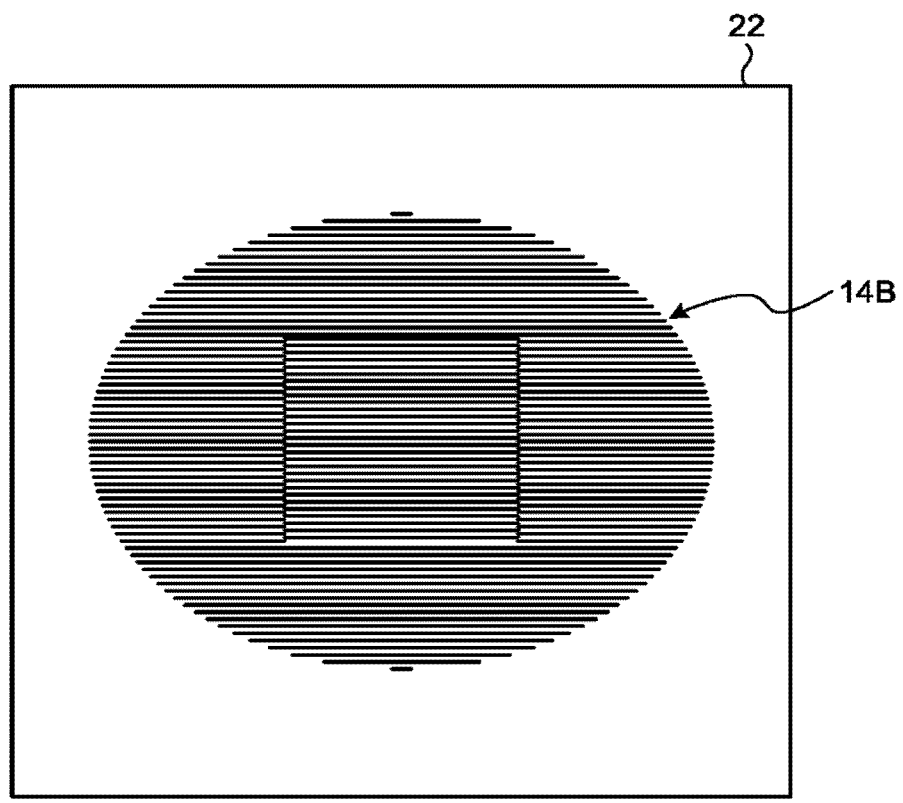
FIG. 9 is a plan view illustrating a second modulation pattern of the security information in the first embodiment.

FIG. 9 is a plan view illustrating a second modulation pattern 14B of the security information 14 in the first embodiment. As illustrated in FIG. 9, the security information 14 includes the second modulation pattern 14B. The second modulation pattern 14B is an example of a second image, and can be referred to also as, for example, information, security information, or a phase-modulated pattern.

The second modulation pattern 14B is formed with invisible, fluorescent ink that emits light when irradiated with excitation light having a second wavelength (about 950 nm) different from the first wavelength of the first excitation light L1, such as the second excitation light L2. Thus, the second modulation pattern 14B is caused to emit light by the second excitation light L2 and appears.

The second modulation pattern 14B emits light in a visible bandwidth indicated by the third spectral distribution curve G3 in FIG. 3 due to the second excitation light L2. Specifically, the second modulation pattern 14B becomes visible or is visualized when irradiated with the second excitation light L2.

As illustrated in FIG. 9, similarly to the first modulation pattern 14A, the second modulation pattern 14B is formed of lines (parallel lines) extending in the first direction with intervals in the second direction. In FIG. 9, the first direction is horizontal direction, and the second direction is vertical direction.

The parallel lines include first lines arranged with predetermined intervals (pitches) in the second direction and second lines shifted from the first lines by, for example, half pitches. The second modulation pattern 14B is not limited to this example. The pitches of the parallel lines of the second modulation pattern 14B and the pitches of the parallel lines of the first modulation pattern 14A are substantially equal to each other.

For example, the second modulation pattern 14B may be formed of dots (halftone dots). The halftone dots include first dots arranged with predetermined pitches in the first direction and the second direction and second dots shifted from the first dots in at least one of the first direction and the second direction by a half pitch, for example.

Figure 10:
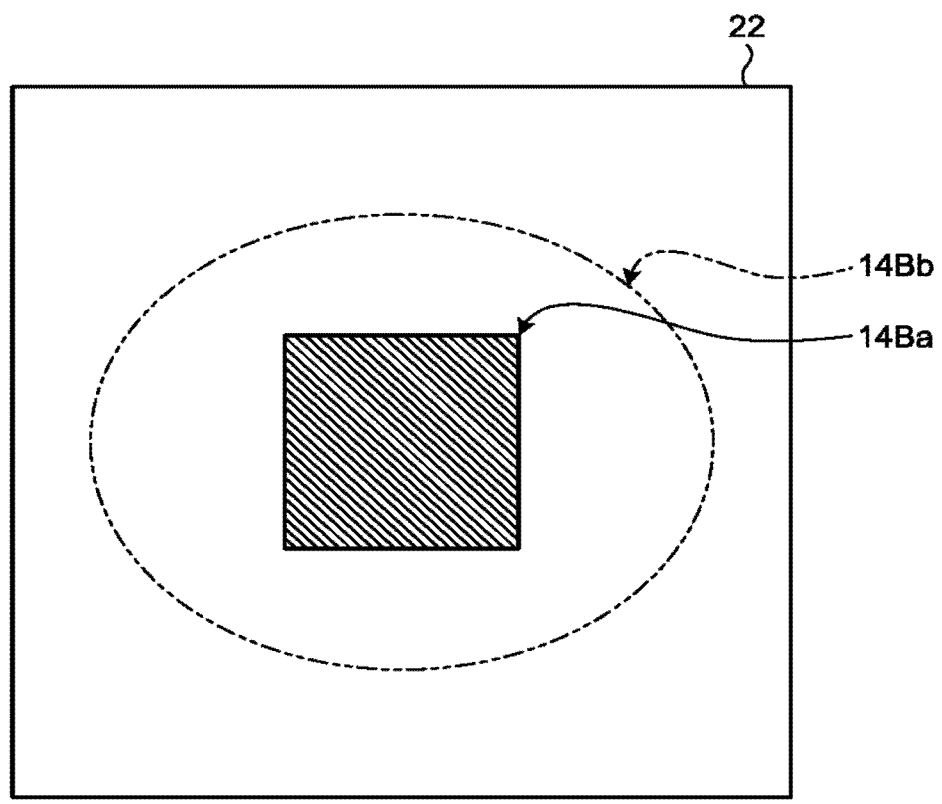
FIG. 10 is a plan view illustrating one second latent image in the first embodiment.
Figure 11:
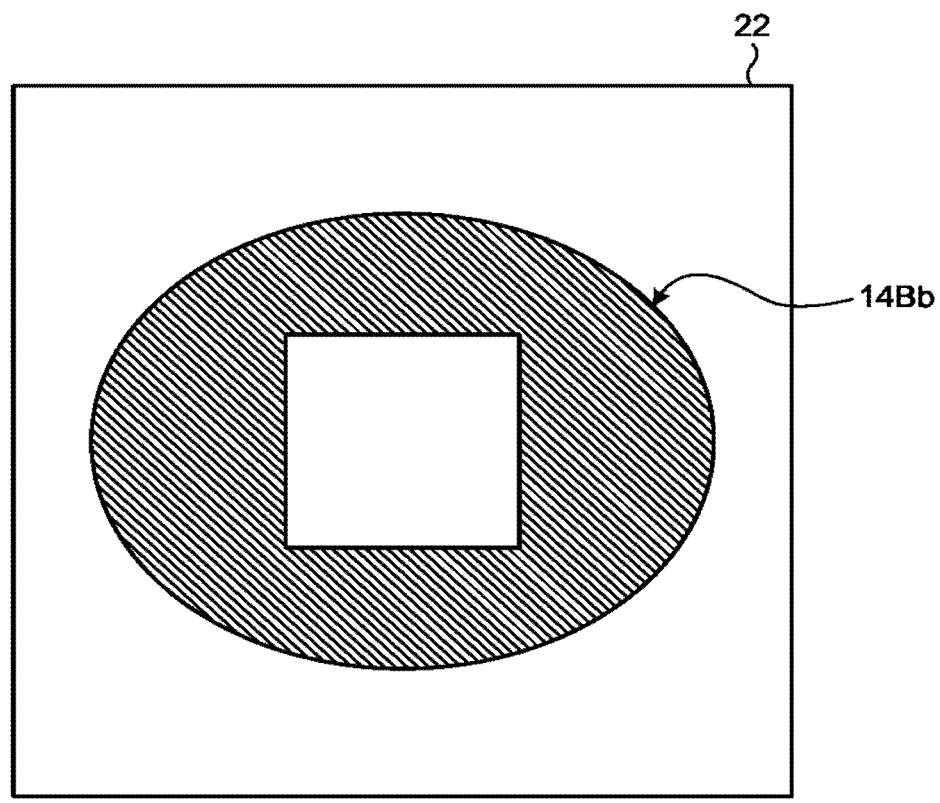
FIG. 11 is a plan view illustrating the other second latent image in the first embodiment.

FIG. 10 is a plan view of a second latent image 14Ba in the first embodiment. FIG. 11 is a plan view of a second latent image 14Bb in the first embodiment. The second latent images 14Ba and 14Bb are examples of second information. The second latent images 14Ba and 14Bb are information hidden in the second modulation pattern 14B. In other words, the second latent images 14Ba and 14Bb are included in the second modulation pattern 14B.

Similarly to the first latent images 14Aa and 14Ab, the second latent images 14Ba and 14Bb are hidden in the second modulation pattern 14B by being subjected to, for example, line phase modulation. In other words, the second latent images 14Ba and 14Bb are subjected to line phase modulation to form the second modulation pattern 14B. The second latent images 14Ba and 14Bb are formed of second lines shifted from the first lines by a half pitch. The second latent images 14Ba and 14Bb may be subjected to another phase modulation.

For example, the second modulation pattern 14B is covered with the discriminant member 52 such that the extending direction of the parallel lines of the second modulation pattern 14B and the extending direction of the semicylindrical lenses of the discriminant member 52 match with each other. In this manner, the second latent images 14Ba and 14Bb appear from the second modulation pattern 14B through the discriminant member 52. In other words, the second latent images 14Ba and 14Bb can be viewed or is visualized. The pitches of the parallel lines and the pitches of the semicylindrical lenses of the discriminant member 52 are substantially equal to each other.

The second latent image 14Ba is displayed (viewed), for example, when the second modulation pattern 14B is viewed from the first position P1 in FIG. 4 through the discriminant member 52. The second latent image 14Bb is displayed (viewed), for example, when the second modulation pattern 14B is viewed from the second position P2 in FIG. 4 through the discriminant member 52. Specifically, the second modulation pattern 14B covered with the discriminant member 52 shows the second latent images 14Ba and 14Bb in different shapes depending on the position of a viewer. In other words, the second latent images 14Ba and 14Bb change in shape depending on the position of a viewer. The second latent images 14Ba and 14Bb may change in two or more different shapes.

As illustrated in FIG. 11, the second latent image 14Bb has an elliptical shape that is hollow inside. The second latent image 14Bb may have another shape. In FIG. 11, the area of the second latent image 14Bb, formed by visible light emitted from invisible, fluorescent ink to be recognized as a different color from the background, is illustrated by hatching.

As illustrated in FIG. 10, the second latent image 14Ba has a quadrangular shape. The second latent image 14Ba may have another shape. In FIG. 10, the area of the second latent image 14Ba, formed by visible light emitted from invisible, fluorescent ink to be recognized as a different color from the background, is illustrated by hatching.

The shape of the second latent image 14Ba substantially matches with the shape of the region surrounded by the elliptical second latent image 14Bb of the shape that is hollow inside. Specifically, the light emitting region and the light non-emitting region are inverse between the second latent image 14Ba and the second latent image 14Bb. That is, when the second latent image 14Ba is positive, the second latent image 14Bb is negative, and vice versa. The second latent image 14Ba and the second latent image 14Bb are not limited to this example. The shape of the second latent image 14Ba substantially matches with the shape of the first latent image 14Ab.

Figure 12:
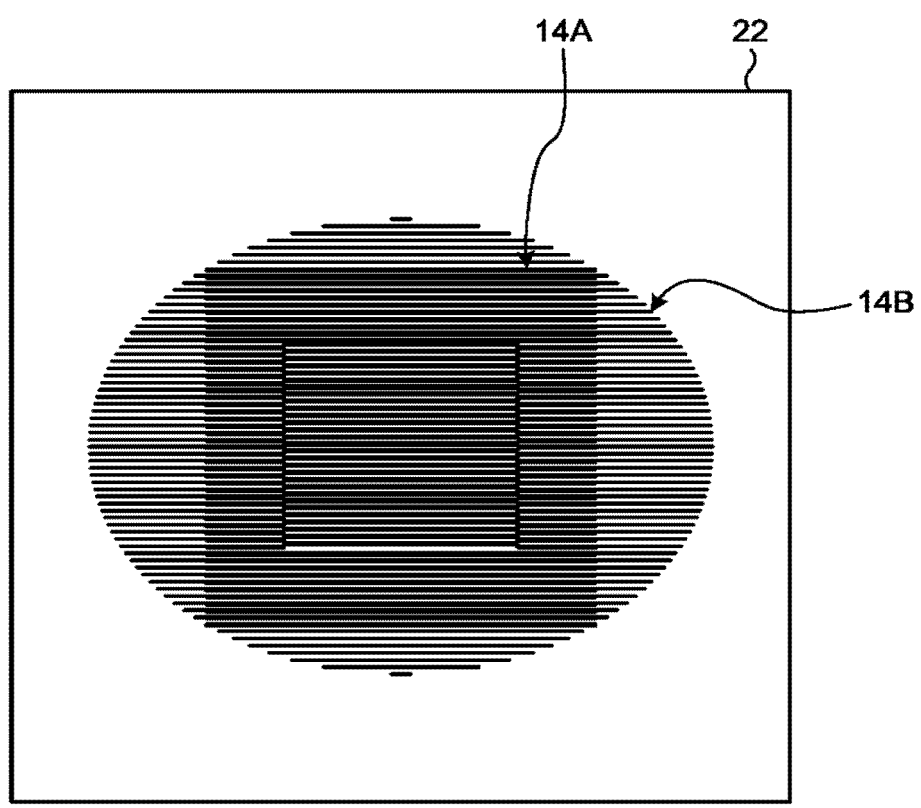
FIG. 12 is a plan view illustrating the first modulation pattern and the second modulation pattern of the security information in the first embodiment.

FIG. 12 is a plan view illustrating the first modulation pattern 14A and the second modulation pattern 14B of the security information 14 in the first embodiment. As illustrated in FIG. 12, when the ID card 10 is simultaneously irradiated with the first excitation light L1 and the second excitation light L2, the first modulation pattern 14A and the second modulation pattern 14B simultaneously emit light and appear.

The second modulation pattern 14B is superimposed at least partially on an area in which the first modulation pattern 14A is formed. The area in which the first modulation pattern 14A is formed is an area inside the boundary between the first modulation pattern 14A and the outside thereof (background). Thus, the parallel lines of the second modulation pattern 14B may be provided apart from the parallel lines of the first modulation pattern 14A. The second modulation pattern 14B has only to be superimposed at least partially on the region inside a virtual contour line (a line surrounding the first modulation pattern 14A) formed by the shape (quadrangle) of the first modulation pattern 14A.

The superimposed part of the first modulation pattern 14A and the second modulation pattern 14B appears to emit brighter light than the first modulation pattern 14A or the second modulation pattern 14B alone.

Figure 13:
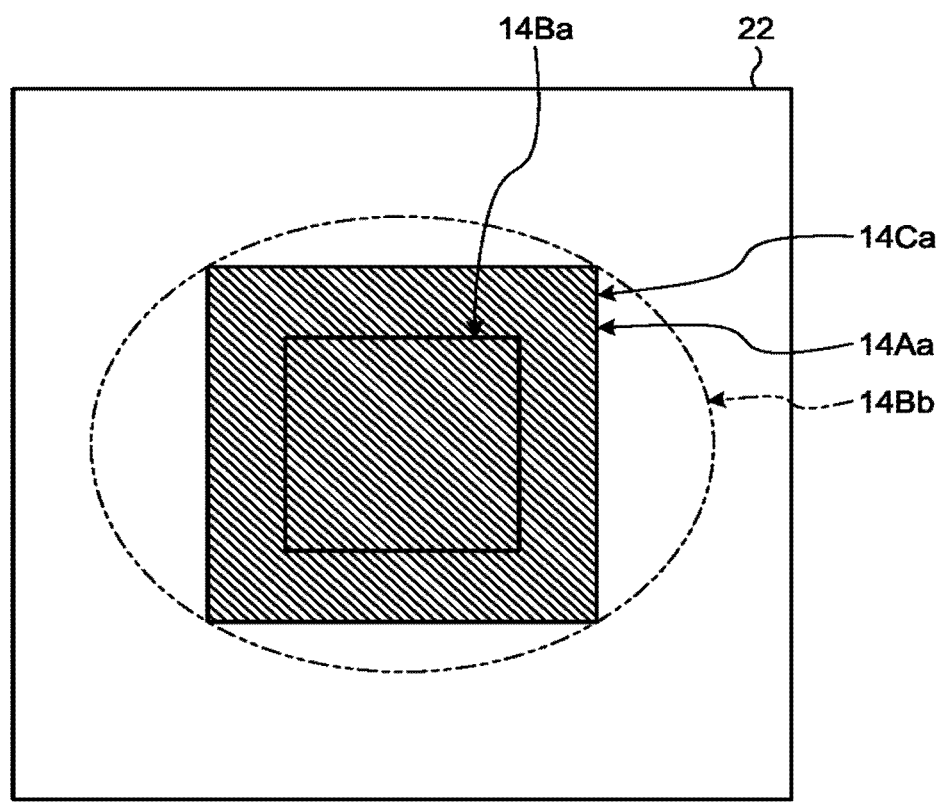
FIG. 13 is a plan view illustrating one first latent image and one second latent image in the first embodiment.
Figure 14:
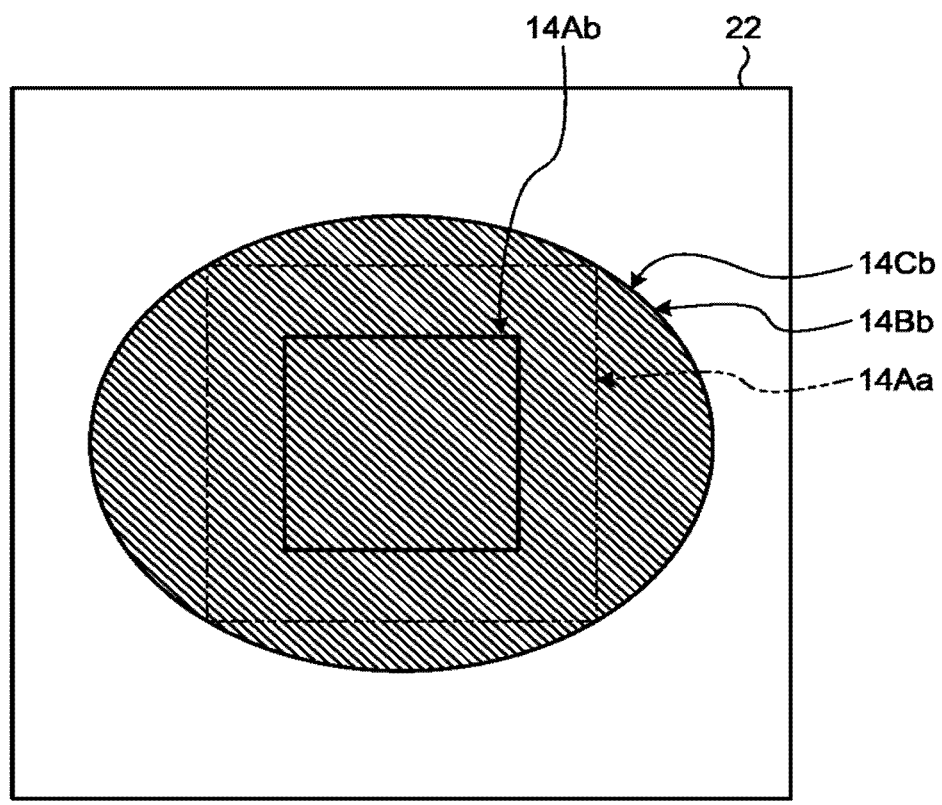
FIG. 14 is a plan view illustrating the other first latent image and the other second latent image in the first embodiment.

FIG. 13 is a plan view illustrating the first latent image 14Aa and the second latent image 14Ba in the first embodiment. FIG. 14 is a plan view illustrating the first latent image 14Ab and the second latent image 14Bb in the first embodiment.

As illustrated in FIG. 13, by simultaneous emission of the first excitation light L1 and the second excitation light L2 to the first modulation pattern 14A and the second modulation pattern 14, the first latent image 14Aa and the second latent image 14Ba, viewed from the first position P1 in FIG. 4 through the discriminant member 52, are simultaneously displayed or become visible. The second latent image 14Ba fills the inside of the first latent image 14Aa. Thus, the first latent image 14Aa and the second latent image 14Ba form a solid, rectangular third latent image 14Ca. The third latent image 14Ca is an example of third information.

The third latent image 14Ca is viewed through the discriminant member 52 as with the first latent images 14Aa and 14Ab and the second latent images 14Ba and 14Bb. In other words, the third latent image 14Ca is also information subjected to line phase modulation.

As illustrated in FIG. 14, by simultaneous emission of the first excitation light L1 and the second excitation light L2 to the first modulation pattern 14A and the second modulation pattern 14B, the first latent image 14Ab and the second latent image 14Bb, viewed from the second position P2 in FIG. 4 through the discriminant member 52, are simultaneously displayed or become visible. The first latent image 14Ab fills the inside of the second latent image 14Bb. Thus, the first latent image 14Ab and the second latent image 14Bb form a solid, elliptical third latent image 14Cb. The third latent image 14Cb is an example of third information.

The third latent image 14Cb is viewed through the discriminant member 52 in the same manner as the first latent images 14Aa and 14Ab and the second latent images 14Ba and 14Bb. In other words, the third latent image 14Cb is also information subjected to line phase modulation.

The third latent images 14Ca and 14Cb have different shapes from those of the first and second latent images 14Aa, 14Ab, 14Ba, and 14Bb, and represent different meaning from that of the first and second latent images 14Aa, 14Ab, 14Ba, and 14Bb. The third latent images 14Ca and 14Cb are not limited to this example.

As illustrated in FIG. 5, upon irradiation with the second excitation light (infrared ray) L2, a determination is made on whether the first latent images 14Aa and 14Ab have changed (S5). For example, it is determined through the discriminant member 52 whether the first latent images 14Aa and 14Ab have changed to the prescribed third latent images 14Ca and 14Cb. In this case, it is determined whether both of the third latent image 14Ca and the third latent image 14Cb are visible. However, whether one of the third latent image 14Ca and the third latent image 14Cb is visible may be determined.

When the change of the first latent images 14Aa and 14Ab is determined (Yes at S5), the first light source 55 stops emitting the first excitation light (ultraviolet ray) L1 while the second light source 56 continues to emit the second excitation light L2 (S6). In other words, the second light source 56 irradiates the security information 14 on the surface 11 of the ID card 10 with the second excitation light L2.

Upon the stop of the emission of the first excitation light L1, only the second excitation light L2 is emitted to the ID card 10, so that the second modulation pattern 14B emits light, but the first modulation pattern 14A stops emitting light. Thus, as illustrated in FIG. 10 and FIG. 11, the second latent images 14Ba and 14Bb appear from the second modulation pattern 14B through the discriminant member 52.

As illustrated in FIG. 5, with the second excitation light L2, whether the second latent images 14Ba and 14Bb continue to be visible are determined (S7). When the continuance of the visible second latent images 14Ba and 14Bb is determined (Yes at S7), the ID card 10 is determined to be genuine (S8). In other words, the ID card 10 is determined to be not a counterfeit but an authentic card.

On the other hand, when the first latent images 14Aa and 14Ab do not appear on the ID card 10 by the emission of the first excitation light L1 (No at S3), when the first latent images 14Aa and 14Ab do not change to the third latent images 14Ca and 14Cb by the emission of the first excitation light L1 and the second excitation light L2 (No at S5), or when the second latent images 14Ba and 14Bb do not remain visible upon the stop of the irradiation with the first excitation light L1 (No at S7), the ID card 10 is determined to be a fake (S9). In other words, the ID card 10 is determined to be falsified.

As described above, the ID card 10 is irradiated with the first excitation light L1 and the second excitation light L2 in a stepwise manner. Thereby, the security information 14 in the ID card 10 shows the first latent images 14Aa and 14Ab, the third latent images 14Ca and 14Cb, and the second latent images 14Ba and 14Bb in a stepwise manner. Thus, by checking the security information 14 that changes in steps, the anti-counterfeit feature of the ID card 10 can be enhanced. The order of the display of the first to third latent images 14Aa, 14Ab, 14Ba, 14Bb, 14Ca, and 14Cb is not limited to the above order.

Without the discriminant member 52, the first modulation pattern 14A and the second modulation pattern 14B both appear on the ID card 10 when irradiated with the first excitation light L1 and the second excitation light L2. The first modulation pattern 14A and the second modulation pattern 14B are phase-modulated such that the first to third latent images 14Aa, 14Ab, 14Ba, 14Bb, 14Ca, and 14Cb are difficult to view. Furthermore, the first modulation pattern 14A and the second modulation pattern 14B may show a dummy image to make the first to third latent images 14Aa, 14Ab, 14Ba, 14Bb, 14Ca, and 14Cb difficult to view.

In the ID card 10 and the authenticity determination device 50 according to the first embodiment described above, the ID card 10 includes: the first modulation pattern 14A that emits light, when irradiated with the first excitation light L1 and includes the phase-modulated first latent images 14Aa and 14Ab; and the second modulation pattern 14B that emits light when irradiated with the second excitation light L2 and including the phase-modulated second latent images 14Ba and 14Bb. Thus, while the ID card 10 is irradiated with the first excitation light L1 and the second excitation light L2, the first latent images 14Aa and 14Ab and the second latent images 14Ba and 14Bb are viewed through the discriminant member 52 that visualizes the phase-modulated first latent images 14Aa and 14Ab and second latent images 14Ba and 14Bb.

When the ID card 10 is irradiated with the first excitation light L1 or the second excitation light L2, only one of the first modulation pattern 14A and the second modulation pattern 14B is displayed. This makes it difficult to notice the presence of the other of the first modulation pattern 14A and the second modulation pattern 14B. Furthermore, the first modulation pattern 14A and the second modulation pattern 14B are subjected to phase modulation to hide the first latent images 14Aa and 14Ab and the second latent images 14Ba and 14Bb for use in the authenticity determination. Thus, the anti-counterfeit or forge-proof feature of the ID card 10 can be enhanced.

The first latent images 14Aa and 14Ab and the second latent images 14Ba and 14Bb form phase-modulated third latent images 14Ca and 14Cb when the first modulation pattern 14A and the second modulation pattern 14B are irradiated with the first excitation light L1 and the second excitation light L2. Specifically, when the ID card 10 is irradiated with the first excitation light L1, the first latent images 14Aa and 14Ab become visible through the discriminant member 52. When the ID card 10 is irradiated with the second excitation light L2, the second latent images 14Ba and 14Bb become visible through the discriminant member 52. When the ID card 10 is irradiated with the first excitation light L1 and the second excitation light L2, the third latent images 14Ca and 14Cb become visible through the discriminant member 52. In this manner, three or more kinds of information are displayed by switching between the first excitation light L1 and the second excitation light L2, which can improve the anti-counterfeit feature of the ID card 10.

The first wavelength of the first excitation light L1 and the second wavelength of the second excitation light L2 are both in an invisible bandwidth. The first modulation pattern 14A and the second modulation pattern 14B each emit light in a visible bandwidth. Thus, only with the first light source 55 and the second light source 56 that apply the first excitation light L1 and the second excitation light L2, and the discriminant member 52 that visualizes the first latent images 14Aa and 14Ab and the second latent images 14Ba and 14Bb, the first latent images 14Aa and 14Ab and the second latent images 14Ba and 14Bb can be visually checked. This eliminates the necessity of a special device such as a camera detectable of light in an invisible bandwidth, enabling a simpler authenticity determination of the ID card 10.

The first wavelength of the first excitation light L1 is in an ultraviolet bandwidth, and the second wavelength of the second excitation light L2 is in an infrared bandwidth. Thus, when irradiated with the first excitation light L1 or the second excitation light L2, one of the first modulation pattern 14A and the second modulation pattern 14B emits light, however, the other of the first modulation pattern 14A and the second modulation pattern 14B is prevented from simultaneously emitting light. This prevents the presence of the other of the first modulation pattern 14A and the second modulation pattern 14B from being noticed, and enhances the anti-counterfeit feature of the ID card 10.

The character information 13, which can be viewed with natural light, is positioned between the substrate 25 and the security information 14. Thus, the light emission from the first modulation pattern 14A and the second modulation pattern 14B of the security information 14 is prevented from being blocked.

The above authenticity determination device 50 is intended for use by an operator to determine the authenticity of the ID card 10 by viewing the ID card 10 from the first window 57 and the second window 58. For example, the authenticity determination device 50 may include a camera and a computer, so that the computer may determine the authenticity of the ID card 10 on the basis of the first to third latent images 14Aa, 14Ab, 14Ba, 14Bb, 14Ca, and 14Cb captured by the camera.

The above computer is a general computer and has a hardware configuration including a controller such as a CPU, a storage such as a ROM and a RAM, an external storage such as a HDD and a CD drive, a display device, and an input device such as a keyboard and a mouse. For example, the CPU (processor) reads and executes a computer program from a storage medium to load and generate the computer program on a main storage to automatically determine the authenticity of the ID card 10.

Now, a second embodiment is described with reference to FIG. 15 to FIG. 18. In the following, components including the same or like functions as the ones in the first embodiment are denoted by the same reference symbols, and descriptions thereof may be omitted. The components denoted by the same reference symbols do not necessarily have the common functions and characteristics, and may have different functions and characteristics suitable for each embodiment.

Figure 15:
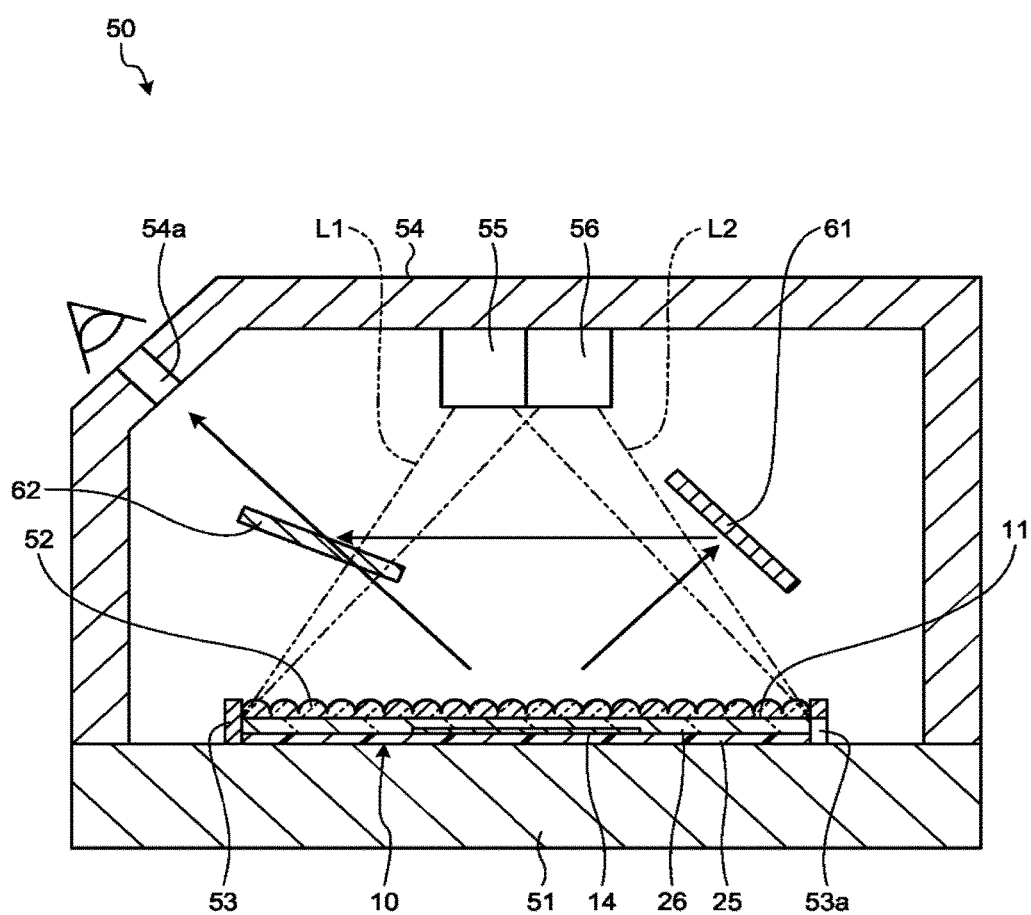
FIG. 15 is a cross-sectional view of an authenticity determination device according to a second embodiment.

FIG. 15 is a cross-sectional view of an authenticity determination device 50 according to the second embodiment. As illustrated in FIG. 15, the authenticity determination device 50 in the second embodiment includes, instead of the first window 57 and the second window 58, a single peep hole 54a, a mirror 61, and a half mirror 62. The peep hole 54a can be referred to also as, for example, a window, a hole, or an opening.

The cover 54 is provided with the peep hole 54a. The peep hole 54a has a size sufficient for a viewer to see the inside of the cover 54 from about the same position. For example, the peep hole 54a is provided at a position, allowing a viewer to see the discriminant member 52 from the same position as the first position P1 in the first embodiment, and faces the discriminant member 52.

The mirror 61 and the half mirror 62 are provided inside the cover 54. The mirror 61 obliquely faces the discriminant member 52. The half mirror 62 is positioned between the peep hole 54a and the discriminant member 52, and obliquely faces the mirror 61 and the peep hole 54a.

When the ID card 10 is irradiated with the first excitation light L1 and the second excitation light L2, the first modulation pattern 14A and the second modulation pattern 14B emit light. Similarly to the first embodiment, the first modulation pattern 14A and the second modulation pattern 14B show the first latent images 14Aa and 14Ab and the second latent images 14Ba and 14Bb through the discriminant member 52.

The first latent image 14Aa and the second latent image 14Ba can be viewed from outside the authenticity determination device 50 through the half mirror 62 and the peep hole 54a. On the other hand, the first latent image 14Ab and the second latent image 14Bb can be reflected by the mirror 61 and the half mirror 62 and viewed from outside the authenticity determination device 50 through the peep hole 54a. Specifically, by the mirror 61 and the half mirror 62, a viewer can view the first latent image 14Ab and the second latent image 14Bb through the peep hole 54a. In this manner, the viewer can simultaneously view the first latent images 14Aa and 14Ab and the second latent images 14Ba and 14Bb through the peep hole 54a.

Figure 16:
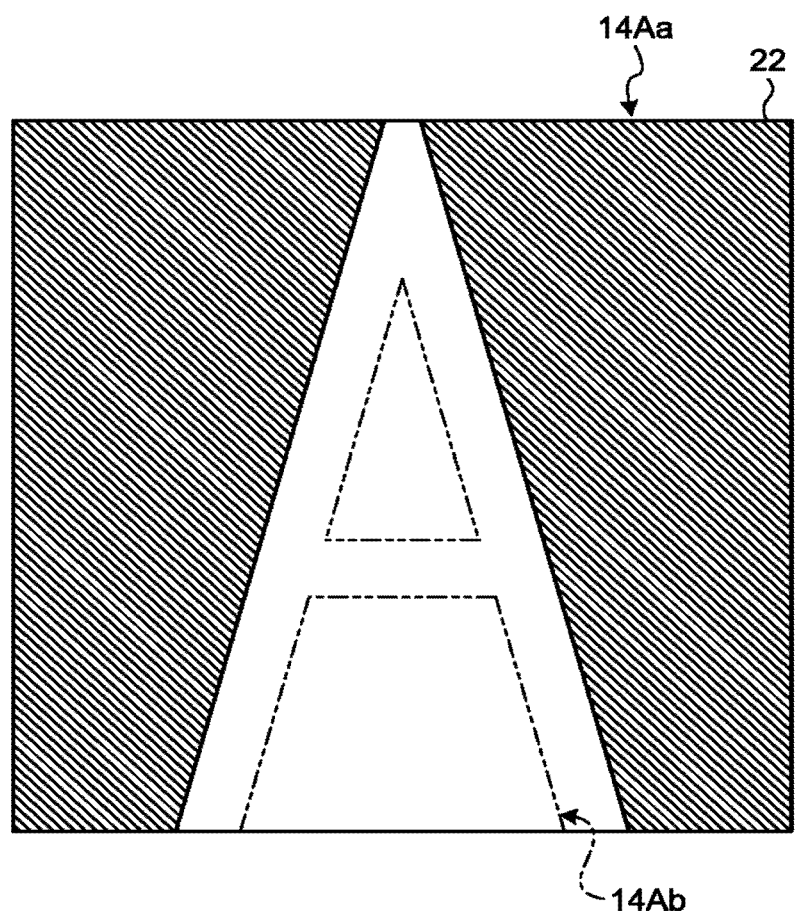
FIG. 16 is a plan view illustrating one first latent image in the second embodiment.
Figure 17:
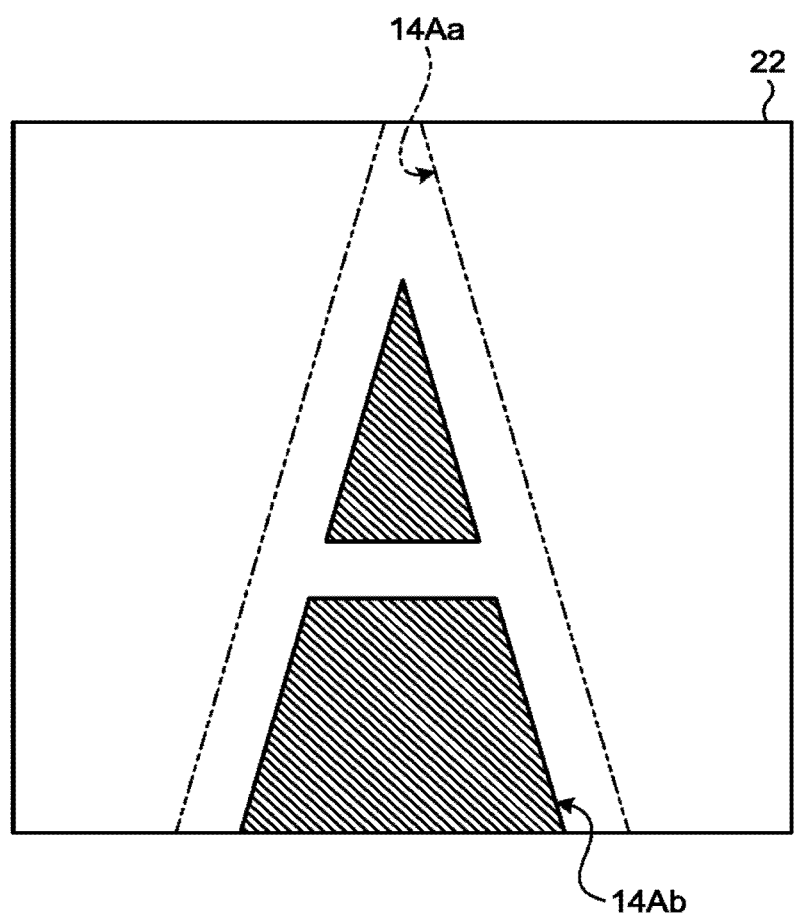
FIG. 17 is a plan view illustrating the other first latent image in the second embodiment.

FIG. 16 is a plan view illustrating the first latent image 14Aa in the second embodiment. FIG. 17 is a plan view illustrating the first latent image 14Ab in the second embodiment. As illustrated in FIG. 16, the first latent image 14Aa is a blank triangle image, for example. On the other hand, as illustrated in FIG. 17, the first latent image 14Ab is of a triangle and a trapezoid vertically arranged, for example.

Figure 18:
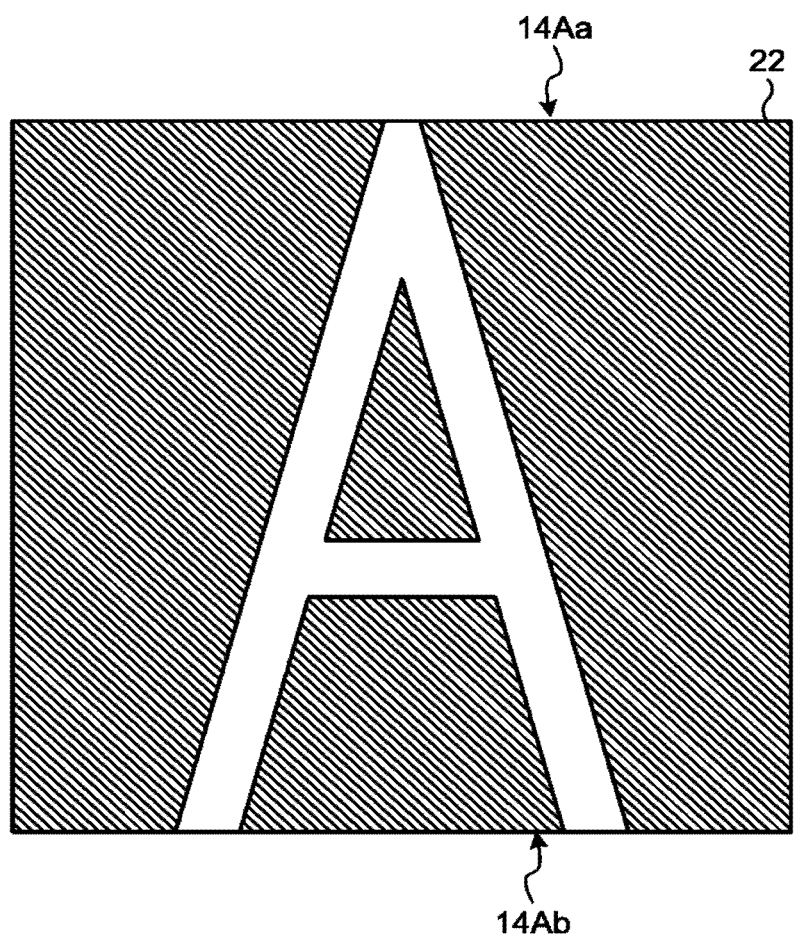
FIG. 18 is a plan view illustrating a synthesized first latent image in the second embodiment.

FIG. 18 is a plan view illustrating a synthesized image of first latent images 14Aa and 14Ab in the second embodiment. As illustrated in FIG. 18, the first latent images 14Aa and 14Ab are simultaneously viewed from the peep hole 54a. Thus, the first latent image 14Aa and the first latent image 14Ab are displayed in a superimposed manner. In other words, the first latent image 14Aa and the first latent image 14Ab are synthesized together by the mirror 61 and the half mirror 62. The first latent images 14Aa and 14Ab make sense when combined, as represented by a blank "A" illustrated in FIG. 18.

The above has described the first latent images 14Aa and 14Ab, and the same applies to the second latent images 14Ba and 14Bb. Specifically, when simultaneously viewed, the superimposed second latent images 14Ba and 14Bb form a sensible image.

In the ID card 10 and the authenticity determination device 50 in the second embodiment described above, the authenticity determination device 50 includes light reflecting members such as the mirror 61 and the half mirror 62. In the authenticity determination device 50, the two first latent images 14Aa and 14Ab, as visible from the two different positions P1 and P2, are reflected by the mirror 61 and the half mirror 62 to be able to be simultaneously viewed through the single peep hole 54a. Thereby, the time necessary for checking the two first latent images 14Aa and 14Ab from the two positions can be reduced.

The two different first latent images 14Aa and Ab are superimposed to form a different image. Thus, the image formed by the first latent images 14Aa and 14Ab is hidden even while one of the first latent image 14Aa and the first latent image 14Ab is visible, to thereby improve the anti-counterfeit feature of the ID card 10.

The cover 54 is provided with the peep hole 54a through which a viewer can view the ID card 10 from about the same position. This can prevent an offset in the positions of the first latent image 14Aa and the first latent image 14Ab.

The first latent image 14Aa and the first latent image 14Ab do not need to have a negative-positive relationship, as described in the second embodiment. For example, the first latent image 14Aa and the first latent image 14Ab may show different characters or character strings. In this case, the first to third latent images 14Aa, 14Ab, 14Ba, 14Bb, 14Ca, and 14Cb each showing a character or a character string may be displayed step-by-step in a prescribed order, thereby forming a character string or a sentence conveying meaning. Thereby, the anti-counterfeit feature of the ID card 10 can be further enhanced.

In the embodiments described above, the discriminant member 52 is, but not limited to, a lenticular lens. For example, the discriminant member 52 may be various kinds of determination devices, such as a parallax barrier and a two-dimensional lens array (microlens array). The discriminant member 52 may be a device which makes phase-modulated information visible by electronic means, for example.

According to at least one of the embodiments described above, the information recording medium includes: a first image that emits light, when irradiated with the first excitation light, and includes phase-modulated first information; and a second image that emits light, when irradiated with second excitation light, and includes phase-modulated second information. This can improve the anti-counterfeit feature of the information recording medium.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information recording medium comprising:
   a substrate;
   a first image that is provided on the substrate, emits light when irradiated with first excitation light having a first wavelength, and includes phase-modulated first information; and
   a second image that is provided on the substrate, emits light when irradiated with second excitation light having a second wavelength different from the first wavelength, and includes phase-modulated second information, wherein,
   the second image is superimposed at least partially on a region in which the first image is formed, and
   the first information and the second information form phase-modulated third information when the first image and the second image are irradiated with the first excitation light and the second excitation light.

2. The information recording medium according to claim 1, wherein
   the first image emits light in a visible bandwidth when irradiated with the first excitation light having the first wavelength in an invisible bandwidth, and
   the second image emits light in a visible bandwidth when irradiated with the second excitation light having the second wavelength in an invisible bandwidth.

3. The information recording medium according to claim 2, wherein
   the first wavelength is in an ultraviolet bandwidth, and
   the second wavelength is in an infrared bandwidth.

4. The information recording medium according to claim 3, wherein
   the first wavelength is 365 nm, and
   the second wavelength is 950 nm.

5. The information recording medium according to claim 1 further comprising:
   a character information formed with ink that reflects visible light, wherein
   the character information is positioned between the substrate and at least one of the first image and the second image.

6. The information recording medium according to claim 1 further comprising
a transparent overcoat layer that covers the first image and the second image.

7. The information recording medium according to claim 1, wherein
the third information has different shape from those of the first and second information.

8. An information recording medium comprising:
a substrate;
a first image that is provided on the substrate, emits light when irradiated with first excitation light having a first wavelength, and includes phase-modulated first information; and
a second image that is provided on the substrate, emits light when irradiated with second excitation light having a second wavelength different from the first wavelength, and includes phase-modulated second information, wherein
the first information are subjected to line phase modulation, and
the first image is formed of parallel lines extending in a first direction with intervals in a second direction, the lines including first lines arranged with the intervals in the second direction and second lines sifted from the first lines.

9. The information recording medium according to claim 8, wherein
the second information are subjected to line phase modulation,
the second image is formed of parallel lines extending in the first direction with intervals in the second direction, the lines including third lines arranged with the intervals in the second direction and fourth lines sifted from the third lines, and
the intervals of the parallel lines of the second image and the intervals of the parallel lines of the first image are equal to each other.

10. The information recording medium according to claim 8, wherein
the first information includes first hidden information that is viewed when the first image is viewed from a first position through a lenticular lens and second hidden information that is viewed when the first image is viewed from a second position through the lenticular lens.

11. The information recording medium according to claim 10, wherein
a light emitting region and a light non-emitting region are inverse between the first hidden information and the second hidden information.

12. The information recording medium according to claim 10, wherein
the first hidden information and the second hidden information form an image that represents recognizable information having a specific meaning, when combined.

13. An authenticity determination method comprising:
covering an information recording medium with a discriminant member that visualizes phase-modulated information;
irradiating a first image with first excitation light, the first image being provided on the information recording medium and emitting light when irradiated with the first excitation light having a first wavelength, the first image including phase-modulated first information;
irradiating a second image with second excitation light, the second image being provided on the information recording medium and emitting light when irradiated with the second excitation light having a second wavelength different from the first wavelength, the second image including phase-modulated second information; and
simultaneously irradiating the first image and the second image with the first excitation light and the second excitation light, respectively, wherein
the first and second information are subjected to line phase modulation and are formed of parallel lines, and
the discriminant member includes an array of semi-cylindrical lenses connected radially and covers the first and second information such that an extending direction of the parallel lines and an extending direction of the semi-cylindrical lenses match with each other.

* * * * *